Patented Aug. 24, 1948

2,447,717

UNITED STATES PATENT OFFICE 2,447,717

FLUORINATION OF ORGANIC COMPOUNDS

Joseph H. Simons, State College, Pa., assignor to Minnesota Mining & Manufacturing Company, St. Paul, Minn., a corporation of Delaware No Drawing. Application December 7, 1946, Serial No. 714,918

8 Claims. (Cl. 260—539)

This application is a continuation-in-part of copending application Ser. No. 562,570, filed November 8, 1944, now abandoned.

This invention relates to a method of directly fluorinating organic compounds by reaction with elementary fluorine in a liquid solvent diluent.

The fluorination of organic compounds in an inert liquid vehicle by means of elementary fluorine has previously been proposed. See the Calcott and Benning Patent No. 2,013,030, issued Sept. 3, 1935, which mentions anhydrous liquid hydrogen fluoride, fluorsulfonic acid, and fluorinated hydrocarbons as suitable. These are representative of acidic and neutral liquids.

I have found that pyridine, which is readily available at a reasonable cost, has marked advantages over the acidic and neutral liquids previously proposed. Pyridine is basic.

Elementary fluorine is the most chemically active element known. Fluorination is somewhat similar to oxidation, but is an even stronger reaction. Fluorine reacts violently with most organic compounds, even at reduced temperatures, causing a destructive decomposition or degradation, unless the reaction is controlled.

Obviously a liquid cannot be used as a diluent vehicle, in which the organic compound to be fluorinated is dissolved, if the vehicle is itself unfavorably reactive to the elementary fluorine. It would naturally be supposed that pyridine would react violently with fluorine, as does benzene.

I have discovered, contrary to expectation, that pyridine has little reactivity to fluorine at temperatures below 0° C. and has other properties which make it highly suitable for use as a fluorination diluent.

When elementary fluorine is introduced into pyridine at reduced temperatures, a molecular complex is formed, wherein fluorine atoms are loosely held by the pyridine molecules, and this complex can act as a fluorinating agent. The complex transfers fluorine to the organic compound solute so as to cause fluorination thereof in a moderate and controlled fashion which avoids the violent and destructive or degradative action characteristic of direct fluorination. The effect is quite different from that resulting when fluorine is dissolved as a simple solution in an inert solvent vehicle which does not form the complex. Moreover, the pyridine absorbs relatively much larger quantities of fluorine than do solvents which do not form such a complex. A further advantage of pyridine is that it is capable of absorbing small amounts of hydrogen fluoride which may be evolved in the fluorination process, without the vehicle being rendered acidic, owing to the basic nature of pyridine. It has been found advantageous to maintain a basic vehicle as such vehicle is more favorable to the desired fluorination reaction in many cases. Pyridine is an excellent solvent, a large number of organic compounds being highly soluble therein.

Pyridine can react with fluorine to form a fluorinated pyridine, such as fluoropyridine (wherein a fluorine atom replaces a hydrogen atom and is directly bonded to a carbon atom by a covalent bond), as distinguished from the additive complex previously mentioned. However, the fluorinated pyridine thus produced is itself a highly stable and insert solvent diluent material. The fluorinated pyridine is basic, forms addition complexes with fluorine, and functions similarly to pyridine. Hence the effect of fluorination of the pyridine solvent is not to decrease the molecular ratio of the inert fluorine-transferring solvent relative to the organic solute being fluorinated, but merely to consume some of the fluorine, making it unavailable for fluorination of the organic solute.

At reduced temperatures, below 0° C., the rate of fluorination of the pyridine solvent diluent employed in the process is quite slow, so that for practical purposes the diluent remains essentially a pyridine solvent and can be recovered as such with little loss.

Even at higher temperatures, the rate of fluorination of the pyridine will be slow when the solvent contains an organic compound solute which is readily fluorinated. In such case the tendency is for the fluorine atoms to fluorinate the solute as against fluorinating the pyridine.

Since fluorinated pyridine is itself an effective inert solvent diluent, it can be recovered and used as the diluent in performing the process upon other occasions. The invention embraces the use of fluorinated pyridine as an inert solvent diluent, and in some cases it may be desired to employ it exclusively, without making use of pyridine.

Thus the invention is not restricted to the use of simple pyridine, but includes pyridine derivatives which likewise form addition complexes with fluorine but are relatively insert to fluorination (i. e. valence bonding of fluorine) when employed as solvent diluents for fluorinatable organic compound solutes. A further example is methyl pyridine. Other compounds containing the pyridine ring may be employed as equivalents, such as quinoline; and other azine ring compounds containing more than one nitrogen atom in the nucleus, such as diazines.

The reaction vessel may be of copper or silver construction to render it corrosion-resistant, provided with a cooling jacket for temperature control, and with mechanical stirring means. The fluorine gas stream preferably enters into the vessel below the liquid surface and in the form of small well-dispersed bubbles. Inlet and outlet ports may be provided for continuous operation. Where the reaction product is removable as a vapor, further additions of the organic reactant may be made from time to time, or continuously, without further addition of solvent diluent. A reflux condenser may be provided.

The fluorine gas may be diluted with an inert gas, such as nitrogen, in order to retard the reaction and permit of better control of heat in the reaction vessel.

A catalyst may be employed but, in general, there is no need for catalytic assistance in view of the fluorination activity.

The reaction of pyridine and fluorine is illustrated by an experiment in which pyridine dissolved in 2-fluoropyridine was treated at 0° C. for four hours with fluorine gas diluted with nitrogen, resulting in the conversion of 40% of the pyridine into fluoropyridine. In this case the fluoropyridine served as an inert solvent diluent. The absence of a different fluorinatable organic solute to preferentially react with fluorine explains why the pyridine was fluorinated to this extent. When such a fluorinatable organic solute is present, the rate of fluorination of pyridine is made much slower, so that it is possible for the pyridine to behave as a highly inert (non-reactive) diluent.

The following examples further serve to illustrate the invention. All parts are by weight, except as noted.

*Example 1*

A reaction vessel was charged with 19 parts of toluene dissolved in 79 parts of pyridine. Fluorine gas diluted with nitrogen (1:25 ratio) was passed through the solution, the temperature being about —20° C. After purification and distillation of the resulting reaction mixture, two fluorinated toluenes were obtained. One distilled at 100–110° C. at a pressure of 120 mm., was more dense than water, and contained by analysis 46.4% fluorine. The other boiled at 93–103° C. at atmospheric pressure and contained 18–20% fluorine.

*Example 2*

Fluorine diluted with nitrogen was passed through a solution of 30 parts acetophenone in 79 parts pyridine at a temperature of —25 to —40° C., resulting in fluorination of the acetophenone and the production of difluoroacetophenone.

*Example 3*

A solution of 90 cc. of dry, refractionated benzene (B. P. 80° C.) in 160 cc. of dry, refractionated pyridine (B. P. 115–116° C.), was treated with 0.75 mol of fluorine, which was diluted with nitrogen in a 1:10 ratio. The nitrogen had been treated with alkaline pyrogallol to remove any oxygen and then dried with phosphorous pentoxide. The reaction temperature was —15° C. The reaction proceeded smoothly. White fumes were evolved and the solution became dark and somewhat viscous.

The reaction products were poured onto ice-cold dilute hydrochloric acid and the resulting black slurry was ether-extracted. The ether solution was separated, washed with water, dried over solid NaOH, and fractionated through a small five-plate column. Cuts boiling from 80–86° C., totalling 23 grams, were refractionated through a small metal-packed column having an estimated 30 theoretical plates. Decalin was used to back the distillation. The following fractions were obtained:

| Cut | B. P. (°C.) | Weight (grams) | Refractive Index |
| --- | --- | --- | --- |
| 1 | 68–79° | 0.2 | |
| 2 | 79–80° | 1.5 | 1.4950 |
| 3 | 80° | 13.5 | 1.4961 |
| 4 | 80–82° | 3.5 | 1.4921 |
| 5 | 82–83° | 2.0 | 1.4753 |

Cut 5 had a molecular weight (Dumas gas density method) of 95.6. It was separated by low temperature filtration through a sintered glass disk, the lower melting fluorobenzene (M. P. —42° C.) being thus separated from the higher melting benzene (M. P. 5° C.). In order to obtain a pure sample of fluorobenzene, only a 0.2 gram sample was collected in the first fraction. This sample had a melting range of —48 to —42° C.; a refractive index of 1.4698; and a fluorine content of 18.6% as determined by Parr bomb fusion and titration of the resultant fluoride ion content with standard thorium nitrate. The theoretical value for fluorobenzene ($C_6H_5F$) is 19.7%; and the reported refractive index value is 1.4684.

The residues from the first fractionation were distilled in a simple distilling flask, and the following cuts were obtained:

| Cut | B. P. (° C.) | Weight (grams) |
| --- | --- | --- |
| 1 | Up to 118° | 3 |
| 2 | 118–123° | 4 |
| 3 | 123–127° | 1.5 |
| 4 | 127–150° | 0.5 |

A black heavy residue remained as a pot residue.

In this experiment only a small amount of fluorinated pyridine was formed, demonstrating the preferential fluorination of the benzene.

*Example 4*

A glass reaction vessel was filled with 65 grams of glacial acetic acid and 169 grams of dry fractionated pyridine. A dry, oxygen-free, fluorine and nitrogen mixture (1:10 ratio) was introduced through a copper tube at the rate of 0.1 mol of fluorine per hour, for a total of 11.5 hours. The reaction vessel was kept at —10 to —25° C. The reaction proceeded smoothly, with the evolution of white fumes.

Products containing combined fluorine were obtained. It appears probable that some fluoroacetic acid was produced.

*Example 5*

Fluorine gas was passed into a 10% solution of benzene in 2-fluoropyridine, at a temperature of 0° C. A solid reaction product was obtained which, after removal of fluoropyridine, was found to contain approximately 20% fluorine by weight.

*Example 6*

A 10% solution of butyric acid in 2-fluoropyridine was treated with fluorine at 0° C. Products containing combined fluorine were obtained, and it appears probable that some fluorobutyric acid was produced.

*Example 7*

Acetic acid dissolved in 2-fluoropyridine was treated with fluorine at 0° C. The reaction proceeded smoothly, without explosion. The products were not analyzed.

Having described various embodiments of the invention, for purposes of illustration rather than limitation, what I claim is as follows:

1. In a process of producing organic fluorine compounds, the steps which comprise reacting fluorine with a fluorinatable organic compound solute in a substantially inert liquid solvent diluent of the class consisting of pyridine and fluorinated pyridine, and recovering a fluorinated product of said solute.

2. A method according to claim 1, wherein a reduced temperature is maintained not exceeding about 0° C.

3. A method according to claim 1, wherein said organic compound is a hydrocarbon.

4. A method according to claim 1, wherein said organic compound is an aromatic hydrocarbon.

5. A method according to claim 1, wherein said organic compound is an acid.

6. A method according to claim 1, wherein said organic compound is acetic acid.

7. In a process of producing organic fluorine compounds, introducing elementary fluorine into a liquid mixture essentially comprising pyridine and an added organic compound solute which is highly reactive to fluorine, the mixture being maintained at a temperature such that the pyridine serves as a liquid solvent diluent which is substantially inert to the fluorine but forms a molecular complex therewith acting as a fluorinating agent for the dissolved organic compound to produce fluorination thereof in a smooth non-violent manner, and recovering a fluorinated product of said organic compound.

8. In a process of producing organic fluorine compounds, introducing elementary fluorine into a liquid mixture essentially comprising fluoropyridine and an added organic compound solute which is highly reactive to fluorine, the mixture being maintained at a temperature such that the fluoropyridine serves as a liquid solvent diluent which is substantially inert to the fluorine but forms a molecular complex therewith acting as a fluorinating agent for the dissolved organic compound to produce fluorination thereof in a smooth non-violent manner, and recovering a fluorinated product of said organic compound.

JOSEPH H. SIMONS.

REFERENCES CITED

The following references are of record in the file of this patent:

UNITED STATES PATENTS

| Number | Name | Date |
|---|---|---|
| 2,013,030 | Calcott et al. | Sept. 3, 1935 |
| 2,013,035 | Daudt et al. | Sept. 3, 1935 |

FOREIGN PATENTS

| Number | Country | Date |
|---|---|---|
| 786,123 | France | June 3, 1935 |